United States Patent [19]
Jakubowski et al.

[11] 3,872,303
[45] Mar. 18, 1975

[54] DEVICE FOR AUTOMATIC EXPOSURE CONTROL IN A SURGICAL MICROSCOPE OR THE LIKE

[75] Inventors: Heinz Jakubowski, Oberkochen; Klaus Leutwein, Essen-Heisingen, both of Germany

[73] Assignee: Carl Zeiss-Stiftung, d/b/a Carl Zeiss, Oberkochen/Wurttemberg, Germany

[22] Filed: Nov. 9, 1973

[21] Appl. No.: 414,534

[30] Foreign Application Priority Data
Nov. 18, 1972 Germany.............................. 424988

[52] U.S. Cl.................................. 250/214 P, 354/79
[51] Int. Cl. ........................................... H01j 39/12
[58] Field of Search .............. 350/17, 19; 95/12, 42; 250/214 P, 201, 229; 355/38, 45; 354/79, 80, 81

[56] References Cited
UNITED STATES PATENTS

| | | | |
|---|---|---|---|
| 3,106,129 | 10/1963 | Frenk.................................. | 350/19 |
| 3,130,634 | 4/1964 | Kropp.................................. | 350/19 |
| 3,205,767 | 9/1965 | Weber.................................. | 350/19 |
| 3,421,806 | 1/1969 | Weber.................................. | 350/19 |
| 3,563,150 | 2/1971 | Klemann.............................. | 355/45 |
| 3,623,807 | 11/1971 | Gabler................................. | 95/12 |
| 3,633,481 | 1/1972 | Kuhl.................................... | 95/42 |
| 3,656,829 | 4/1970 | Wilms.................................. | 350/19 |
| 3,721,170 | 3/1973 | Johnson............................... | 350/18 |

Primary Examiner—James W. Lawrence
Assistant Examiner—D. C. Nelms
Attorney, Agent, or Firm—Nichol M. Sandoe

[57] ABSTRACT

The invention contemplates a self-contained and fully automatic connection piece for connecting an optical instrument such as a surgical microscope to any of a wide variety of different photographic or television cameras, the automatic feature being that of correct exposure setting, independent of the kind of camera selected for use.

6 Claims, 1 Drawing Figure

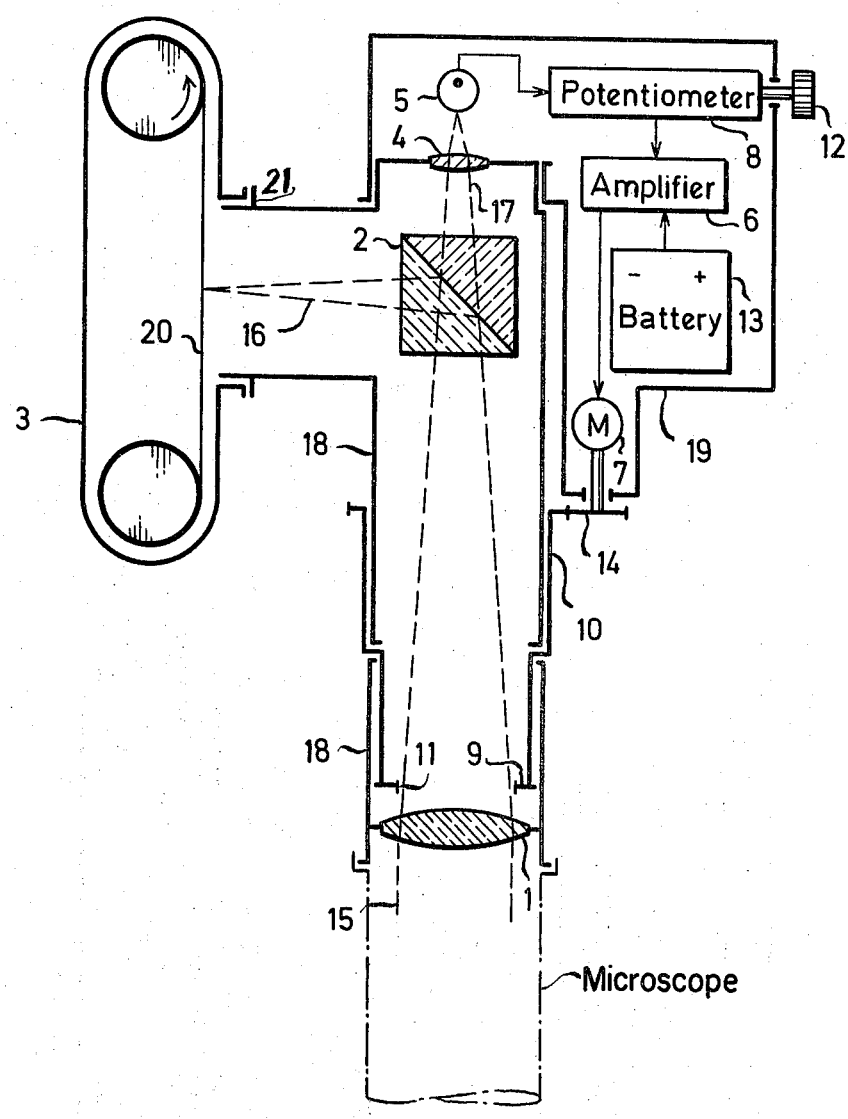

DEVICE FOR AUTOMATIC EXPOSURE CONTROL IN A SURGICAL MICROSCOPE OR THE LIKE

This invention relates to a device using a motor-actuated diaphragm for the automatic control of exposure when making film shots and/or television pictures through a surgical microscope or the like.

For the indicated purpose, it has already been proposed to provide a connecting piece between a photographic camera and a microscope and to provide in the connecting piece a motor-actuated iris diaphragm, the actuating motor for the iris diaphragm being connected for control by the output of the camera light-measuring arrangement, via an exposure control and amplifier system. it has also been proposed to provide the connecting piece including the iris diaphragm with an adapter optical system and to design it as a separate component adapted to be attached directly or indirectly to the photographic camera and the microscope. Such structures suffer from the shortcoming that they are limited to use with a specific camera, since the light-measuring system of this camera is used for the exposure control; every change of camera, or any optional change to a television transmission system, again raises the problem of correct exposure.

It is therefore an object of the invention to provide means which will condition the use of a surgical microscope or the like with any film and television camera, such that for any such camera, exposure is adjusted to the correct value by an automatic diaphragm control.

According to the invention, this object is realized by providing all indicated features within a connecting piece between the surgical microscope and the camera. Thus, the connecting piece may include image-forming means and a beam splitter which directs one part of the incident light into the camera and transmits the other part of the incident light to a photoelectric detector via an image-forming system; also, there are provided an amplifier for the photoelectric current and a motor including a pinion for actuation of the diaphragm via a diaphragm ring and the follower sleeve, as well as selectively operable control means for pre-adjustment of exposure parameters. The beam splitter may be, for example, a beam-splitting cube or partially reflecting plate. The amplifier and the motor may be supplied by self-contained batteries; alternatively, an external supply can be provided, if desired, by a separate power supply means.

The advantage provided by the invention results from the fact that automatic exposure control is completely removed from the camera and is placed into the connecting piece between microscope and camera. The selectively operable control means provided in this connecting piece enables pre-adjustment of exposure parameters decisive for optimum light conditions. Correct exposure is thus obtained independently of the camera, as long as the camera is of the removable lens variety, as is the case, for example, with many 35-mm cameras today. The image-forming system of the connecting piece transmits the image of the microscope picture to the film of the camera, and the optional change to a television camera does not offer any further difficulties. A further advantage of the invention resides in the fact that it is also applicable to an instrument-controlled diaphragm.

An illustrative embodiment of this invention is shown diagrammatically in the single FIGURE of the accompanying drawing and will now be described more fully.

In the drawing, a unit-handling connector piece of the invention is shown connecting a surgical microscope or the like (suggested by fragmentary phantom outline and identified by legend) to the lens-mount opening of a photographic camera body 3. The connector piece includes objective means 1. Light beam 15 from the microscope enters through the objective 1 and through an iris diaphragm 11, and is deflected as a partial beam 16 by beam-splitting means 2 for imaging at the film 20 of camera 3; the beam splitter 2 may for example be a semi-reflecting plate or beam-splitting cube, as shown. A partial beam 17 of the incident light is not deflected by the splitter 2, but is imaged onto photoelectric detector means 5 by an optical system 4 comprised of one or more lens elements.

The electric signal output of the photoelectric detector means 5 is a measure of theillumination of the detector means 5 and is therefore also representative of the intensity of illumination on the film 20. Selectively operable means such as a control knob 12 for adjustment of a potentiometer 8 enables presetting the exposure system for the exposure parameters, such as film sensitivity and film speed. As shown, photoelectric signal output, corrected by the setting of potentiometer 8, passes to a motor 7 via an amplifier 6, said motor driving the diaphragm 11 via a pinion 14 through a diaphragm ring 9 and follower sleeve 10. Amplifier 6 and motor 7 are supplied by self-contained batteries 13, but if desired it will be understood that an external power source may be used.

The device is designed so that the control circuit comprised of photoelectric detector 5, control means 12, amplifier 6, motor 7 and batteries 13 is a first unit-handling subassembly in a separate housing 19, with said subassembly being detachably assembled to a second unit-handling subassembly, namely, the housing 18 for the optical parts; the second subassembly will be understood to additionally include means as at 21 for correct positioning accommodation of the camera body to assure a focused image at 20.

What is claimed is:

1. A self-contained unit-handling automatic-diaphragm connecting-piece assembly for selective interposition between a surgical microscope equipment and a continuously viewing camera, said assembly comprising a housing having separate means at each of two spaced openings for separable connection to such an equipment and to a selected camera body, one of said openings being on a first axis of equipment-attachment and the other of said openings being on a second axis of camera-body attachment, image-forming means mounted in said housing on said first axis, optical means including a beam-splitter mounted in said housing and so oriented with respect to said image-forming means that light entering said housing via said image-forming means is divided in part to said second axis and is further divided along a third axis, photoelectric-detector means carried by said housing and positioned for response to light directed along said third axis, amplifier means connected for response to the output of said detector means, a motor connected to drive in response to the output of said amplifier means, and a variable diaphragm carried by said housing on said first axis and coupled to said motor for varying the setting thereof, whereby exposure at an attached camera body is automatically regulated independent of camera body and for a span of field brightness as presented by an optical equipment attached at said one opening.

2. The automatic exposure control means of claim 1, wherein said beam-splitter means is a beam-splitting cube.

3. The automatic exposure control means of claim 1, wherein said diaphragm means includes an adjustment ring, and a pinion drive from said motor to said ring.

4. The automatic exposure control means of claim 1, wherein said amplifier means and motor are supplied by a self-contained electric-power source.

5. The automatic exposure control means of claim 1, wherein means are provided for selectively adjusting the output level of said photoelectric means, and a control element for said adjusting means and accessible externally of said housing.

6. The automatic exposure control means of claim 1, wherein said photoelectric detector means, amplifier means and motor are all mounted and in unit-handling relation with a first housed subassembly, and wherein said image-forming means, diaphragm means and beam-splitter means are all mounted and in unit-handling relation with a second housed subassembly, said second subassembly having both said separate means of connection on said first and second axes, and said first and second subassemblies being detachably assembled to each other.

* * * * *